US005542802A

United States Patent [19]

Woodman, Jr. et al.

[11] Patent Number: 5,542,802

[45] Date of Patent: Aug. 6, 1996

[54] WICKET STACKING GUIDE

[75] Inventors: Daniel W. Woodman, Jr., Beverly, Mass.; Vance St. Hilaire, Kingston Springs, Tenn.; Guilherme A. Silva, Gloucester, Mass.

[73] Assignee: Battenfeld Gloucester Engineering Co., Inc., Gloucester, Mass.

[21] Appl. No.: 326,543

[22] Filed: Oct. 20, 1994

[51] Int. Cl.[6] .................................................... B65G 61/00

[52] U.S. Cl. ................................ 414/27; 53/572; 493/204

[58] Field of Search ............................. 414/27, 908, 923; 271/220, 903; 211/50, 57.1; 53/572; 383/37; 83/157; 493/204

[56] References Cited

U.S. PATENT DOCUMENTS

| | | | |
|---|---|---|---|
| 3,555,977 | 1/1971 | Saumsiegle | 414/27 |
| 4,231,558 | 11/1980 | Aterianus et al. | 414/27 |
| 4,286,907 | 9/1981 | Houle et al. | 414/72 |
| 4,693,701 | 9/1987 | deBin | 414/27 |
| 4,796,499 | 1/1989 | Achelpohl | 414/27 |
| 5,232,325 | 8/1993 | Kohn et al. | 414/27 |

*Primary Examiner*—Karen B. Merritt
*Assistant Examiner*—Douglas Hess
*Attorney, Agent, or Firm*—Donald J. Shade

[57] ABSTRACT

A sideweld bag making machine utilizing a rotary transfer device and wicket conveyer is equipped with a movable bag stacking guide that is used to align bags as they are stacked on the wicket conveyer. The bag stacking guide, which is mounted on the wicket conveyer, has a first raised position for accumulating bags as they are made, and a second lowered positioned to free stack bags for wicket conveyer indexing. The stacking guide is particularly useful for bags having lengths substantially greater than their width.

10 Claims, 7 Drawing Sheets

WICKET STACKING GUIDE

BACKGROUND OF THE INVENTION

1. Field of the Invention

This invention pertains to an improved mechanism for forming a precisely aligned stack of wicketed bags in a bags machine having a rotary bag transfer mechanism and a wicketing conveyer.

2. Prior Art

The practical importance of forming accurately stacked bags on either transfer pins or wickets to aid future utilization of the stacked bags has long been recognized. Although early attempts at stacking bags on an upstanding wicket utilized "plunger" type delivery system, e.g. U.S. Pat. No. 3,555,977, modern wicket stacking bag machines almost universally utilize a rotary transfer mechanism. A typical example of this transfer mechanism is shown generally in U.S. Pat. Nos. 3,921,827 and 4,286,907.

While utilization of the rotary type transfer device has solved many of the stack quality problems associated with earlier devices and methods, significant stack quality problems remain, particularly when the bags have lengths substantially greater than their width. In these instances, as the bags are stacked upon the wicket transfer pins they tend to spread, i.e. fan out, at their lower ends, requiring the bag packer to rearrange the bag stacks prior to packing them.

It is therefore an object of the present invention to provide a new and improved wicket stacking conveyer that will ensure the production of properly aligned bag stacks, particularly for bags having a length substantially greater than their width. It is a further object of the present invention to provide an auxiliary stacking device or guide that can be retrofitted to existing wicket conveyers to provide for properly aligned stacks of bags, particularly for bags having a length substantially greater than their width.

SUMMARY OF THE INVENTION

In accordance with the present invention there is provided a movable bag stacking and abutment apparatus for use on a wicket conveyer comprising:

a) a bag supporting surface mounted adjacent to a wicket conveyer stacking station, said supporting surface having a first bag receiving position and a second bag stack indexing position, b) means for moving said bag supporting surface between said first bag receiving position and said second bag stack indexing position, c) a forward stop projecting from the forward end of said bag supporting surface.

d) a rear stop projecting from the rearward end of said bag supporting surface, and e) stacking surface control means associated with said bag maker and said wicket conveyer for moving said bag support surface from said bag receiving position to said bag stack indexing position and back again in accordance with bag production and wicket conveyer indexing.

DESCRIPTION OF THE PREFERRED EMBODIMENT

Figure 1:
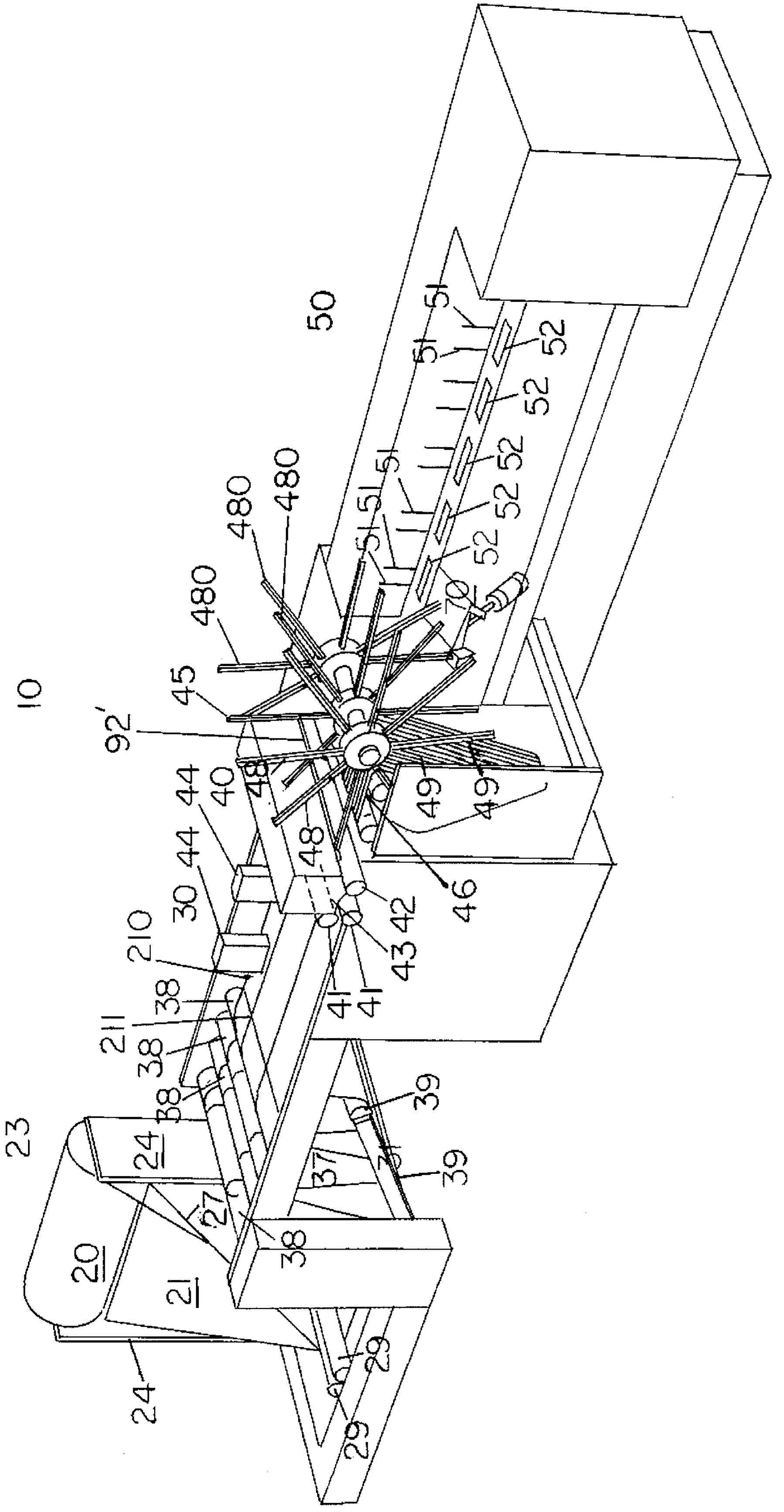
FIG. 1 shows an overall view of a sideweld bag making machine having a rotary transfer device and wicket conveyer utilizing a movable bag stacking and abutment apparatus according to the present invention.

A typical sideweld bag making machine 10 having a rotary transfer device 45 and wicket conveyer 50 utilizing a movable bag stacking and abutment apparatus 70 is shown in FIG. 1. The bag making machine itself is preceded by a large roll of plastic film 20 mounted on supports 24 in unwind stand 23. Film 21 is drawn off roll 20 and over folding frame 27, through creasing rolls 29 and into bag machine 10. Film 21 is aligned with folding frame 27 in such a manner that edges 210 and 211 of film 21 are not placed directly on top of each other. Rather, there is a transverse displacement of edge 210 with respect to edge 211 so as to provide a lip 91 in finished bag 90 through which openings will be placed and through which transfer wicket pins 51 will pass as the bag is stacked on wicket conveyer 50.

Bag machine 10 is of the known type, having a compensation section 30, a sealing section 40, a transfer section 45, and a wicket conveyer section 50. Film 21 is drawn into compensation section 30 by capstan rolls 36, not shown in FIG. 1. After the capstan rolls 36, film is alternately passed under and over a series of fixed rolls 38 and movable rolls 39 mounted on an elastically biased arm assembly 31, said series of fixed and movable rolls comprising a film accumulation device 37. Modern high speed bag making machines such as the machine shown as 10 in FIG. 1 may also have a single roll anti-bounce assembly 32 after film accumulation device 37, although no such assembly is shown on the bag machine of FIG. 1. Following the accumulation device, the film passes towards draw rolls 41, through compensation section 30 wherein a series of hole punches 44 are installed. Hole punches 44 are used to form openings 93' in film 21 through which the transfer wicket pins 51 on wicket conveyer section 50 eventually will pass. As previously described, openings 93' are located in the transversely displaced portion of the web that will be the lip 91 of finished bag 90.

Figure 2:
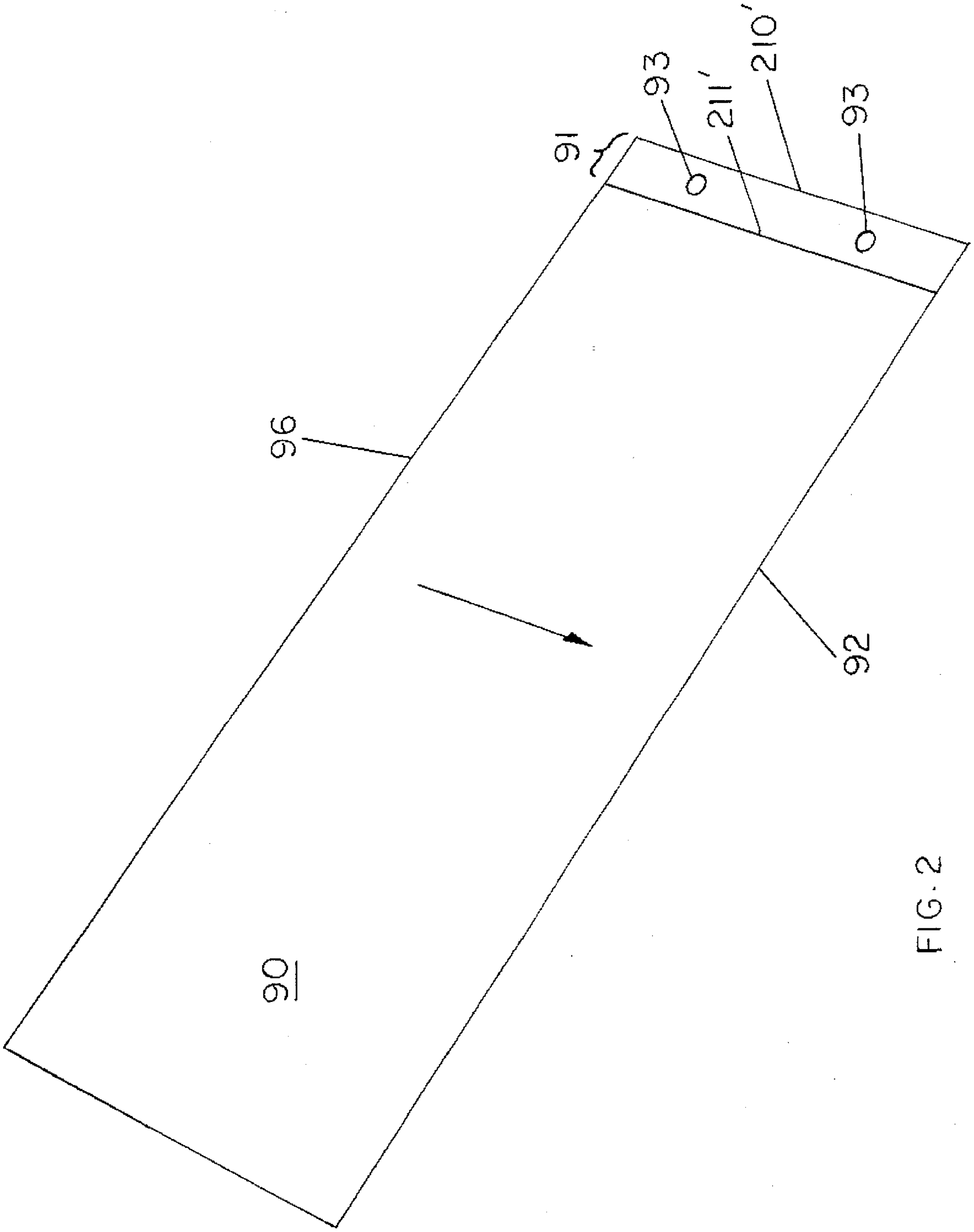
FIG. 2 shows a sidewelded bag having a length substantially greater than its width.

For reference purposed, FIG. 2 shows a bag of the type that would preferably be used in conjunction with this present invention, i.e. a wicketed bag having a length substantially greater than its width. Bag 90, is a lip type bag having openings 93 in the lip 91 of the bag. Lip 91 is formed between the displaced edges 210 and 211 of folded film 21. These displaced edges in finished bag 90 are identified as 210' and 211'. Also shown in FIG. 2 is a reference arrow showing this direction of film advance through the machine. Finished bag 90 also has a leading edge seal 92, and a trailing edge seal 96.

Once again with reference to FIG. 1, sealing section 40 contains draw rolls 41, sealing roll 42, hot knife 43, and their associated drive mechanisms. Although the present invention can be used on all known bag making machines equipped with rotary transfer devices 45, it is preferably used on modern bag making machines in which draw rolls 41 are driven by a numerically controlled servo-drive, and in which the hot knife 43 is driven by a stepping motor drive system. Draw rolls 41 are used to advance a length of folded film 21 corresponding to the width of the desired finished bag. Once this length of folded film has been advanced, hot knife 43 descends upon folded film 21 which is supported on sealing roll 42. The hot knife melts through the folded film, simultaneously severing folded film 21 and forming the trailing edge seal 96 on bag 90 and forming the leading edge seal 92' on folded film 21. Seal 92' will be the leading edge seal 92 on the next bag to be produced at sealing station 40.

Upon advance of folded film 21 by draw rolls 41, the leading edge of folded web 21 containing leading edge seal 92' is advanced onto either a rope conveyer 46 as shown in FIG. 1, or onto a metal grid that serves as the pickup position of transfer section 45. A rope conveyer is schematically illustrated in FIG. 1. The locations of the individual ropes 49 in the conveyer 46, as well as the conveyer mechanical structure, are selected to provide a relatively uniform support surface for the bag, but with necessary openings or channels 47 to permit passage of the individual arms 48 of rotary transfer device 45.

In operation, draw rolls 41 deliver the sealed end of the film onto the rope conveyer 46, the hot knife 43 descends on the folded film 21 separating the material on the conveyer from the balance of the film 21 and simultaneously sealing the trailing edge of the material on the conveyer to form a completed bag 90 and forming the leading edge seal 92 on the folded film 21 in anticipation of formation of the next bag. Shortly after the sealing and severing of the material on the seal roll 42, a series of parallel and aligned transfer arms 48 on rotary transfer device 45 will pass through the open channels 47 in rope conveyer 46 and contact the bag 90 from beneath. The surfaces of the transfer arms 48 that contact the bag 90 have a series of ports not shown in FIG. 1 that are connected through the structure of the rotary transfer device 45 to a source of vacuum. This vacuum, when applied to the bag through the ports in the transfer arms 48, hold the bag securely in place on the rotary transfer arms 48. Rotary transfer device 45 as shown in FIG. 1 has eight sets of transfer arms 48. In practice, while eight sets of transfer arms 48 are frequently used, other numbers of arms can also be used. Also, while three transfer arms 48 as shown in FIG. 1 comprise each set as is customary for long bags, rotary transfer device 45 can have as few as two transfer arms 48 per set, or any number greater than three as required by the particular bag geometry.

Transfer arms 48 pick up a bag 90 at rope conveyer 46 as previously described, and carry it to a stacking station equipped with one or more largely vertical sets of transfer wicket pins 51 mounted on a stacking plate 52 attached to indexing conveyer chain 53 not shown in FIG. 1. As the transfer arms 48 carrying the bag away from rope conveyer 46 continue to rotate, they will eventually deposit the bag 90 onto transfer wicket pins 51, with the pins 51 passing through the previously punched openings 93 along the bag lip 91. As the bags are passing over transfer wicket pins 51, transfer arms 48 carrying the bag 90 are disconnected from the source of vacuum and connected to a source of compressed air. The combination of lack of vacuum and pressurization of the arms by the compressed air release the bag from the arm, and the bag drops to stacking plate 52 at the base of transfer wicket pins 51.

Figure 3B:
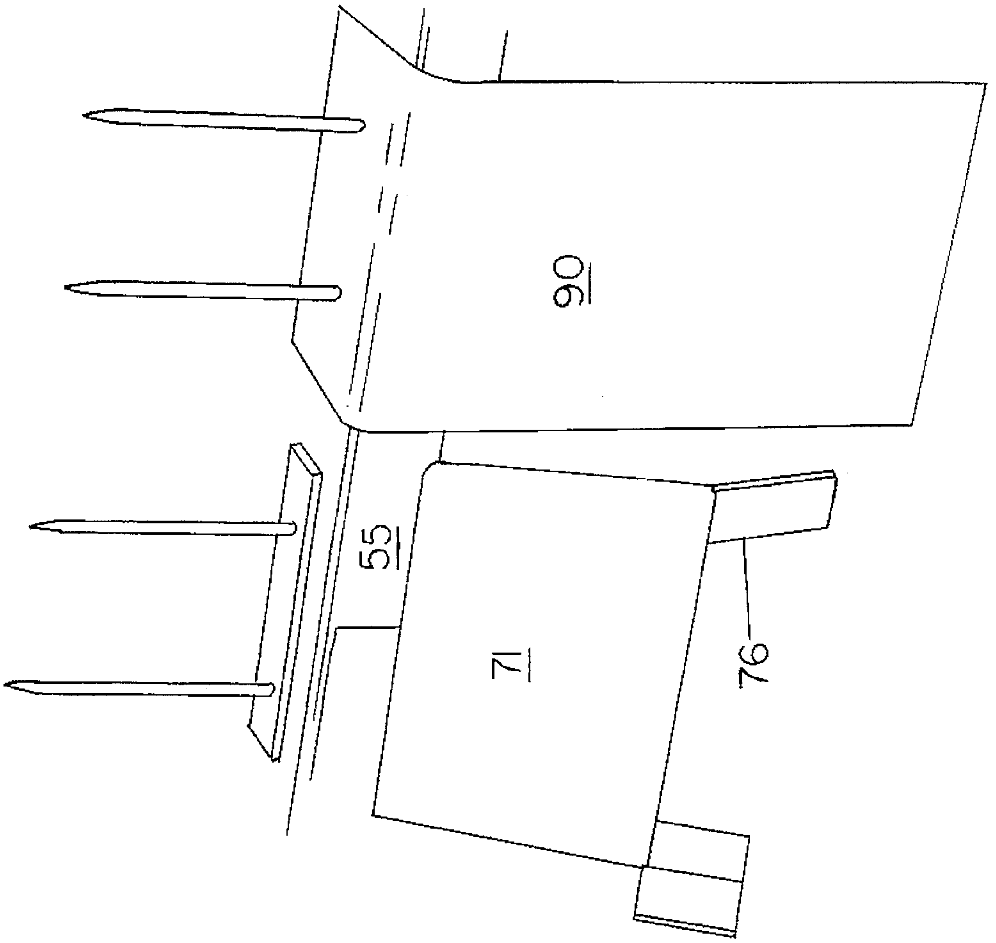
FIGS. 3*a* through 3*c* schematically shows the position of the bag support surface and superimposed stack of bags and two stations of the wicket conveyer during a wicket conveyer indexing cycle.
Figure 3A:
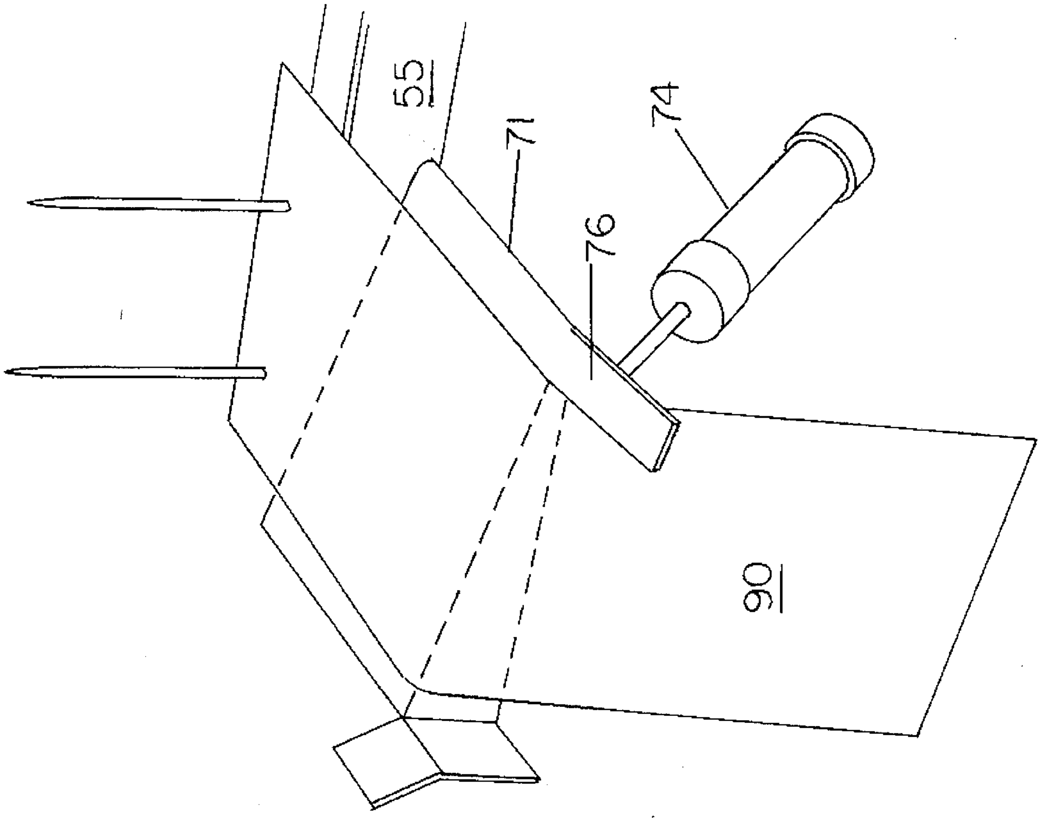
Figure 3C:
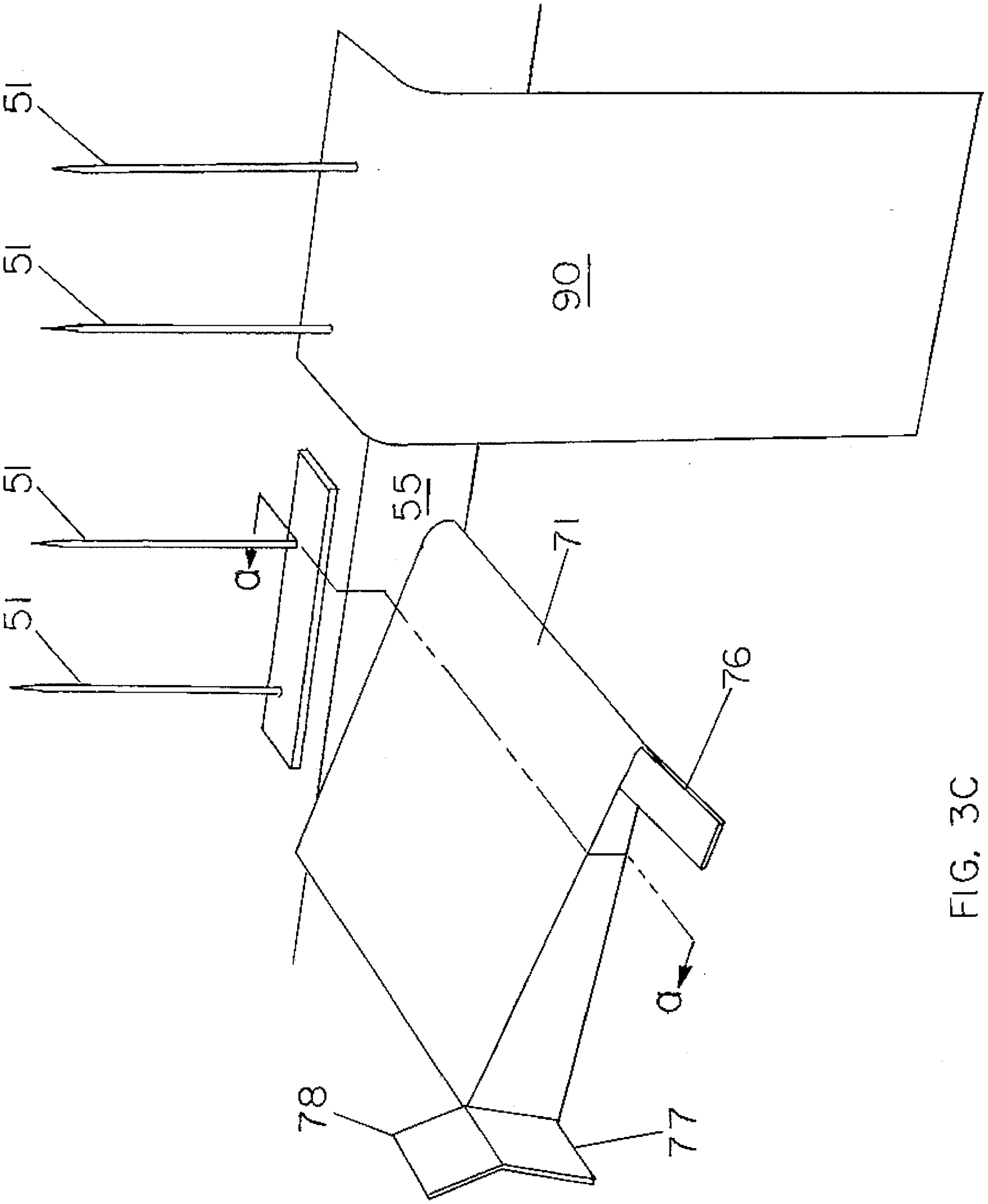
Figure 6:
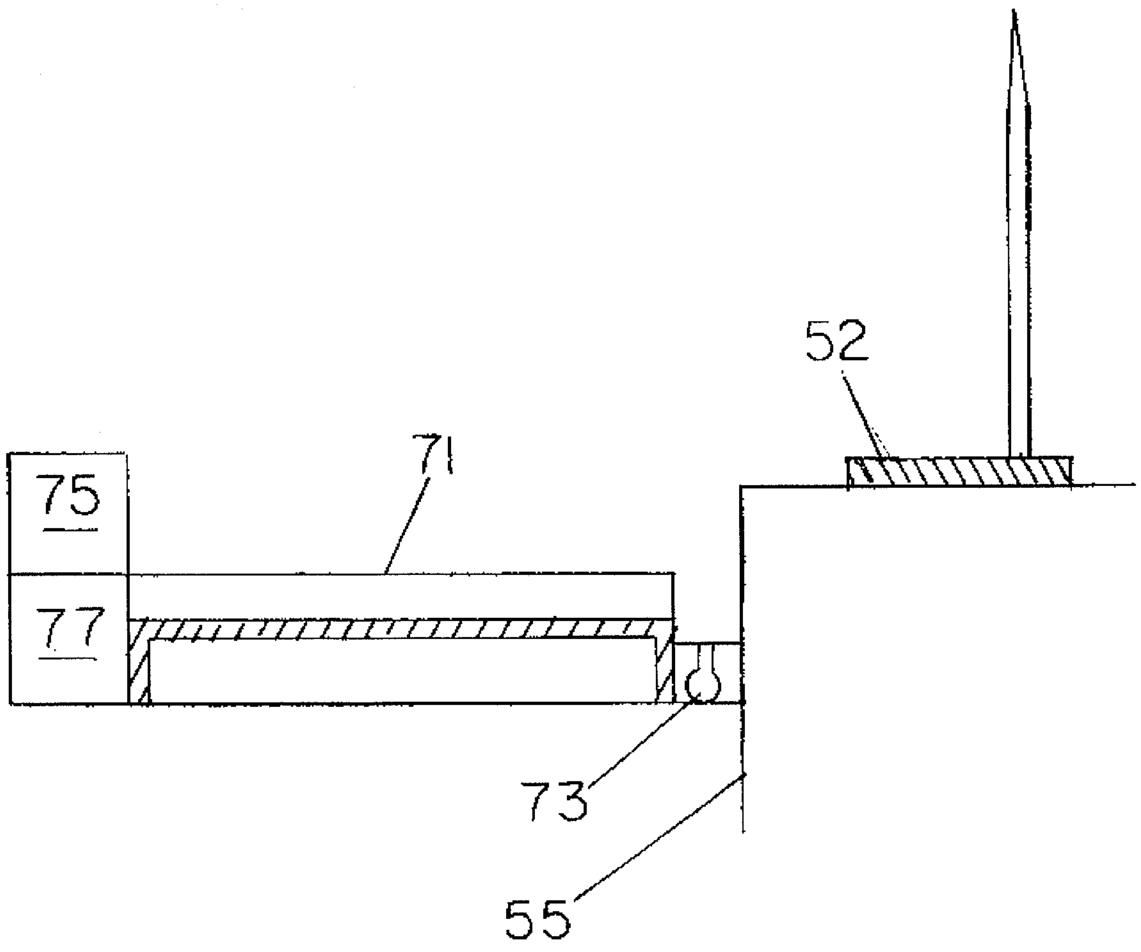
FIG. 6 shows a section through the movable bag support and wicket conveyer along the plane "*a—a*" shown in FIG. 3*c*.

Extending from the side of wicket conveyer 50 at the stacking station is bag stacking and abutment apparatus 70. As shown in FIG. 3, bag support 71 has a first raised position shown at FIG. **3*a*, for supporting bags as they are stacked on transfer wicket pins 51, and a second lowered position shown at FIG. 3*b*, to permit indexing of completed bag stacks from the stacking station. FIG. 3*c* shows bag support 71 in the raised position ready to receive bags following a wicket conveyer index cycle. Bag support 71 is connected to frame 55 of wicket conveyer 50 by a hinged connection 73 shown in FIG. 6, that permits bag support 71 to rotate between a first raised position shown in FIG. 3*a* and FIG. 3*c*, and a second lowered position shown in FIG. 3*b*. Movement of the bag support 71 between positions is accomplished by means of air cylinder 74**, or other conventional device.

Figure 4:
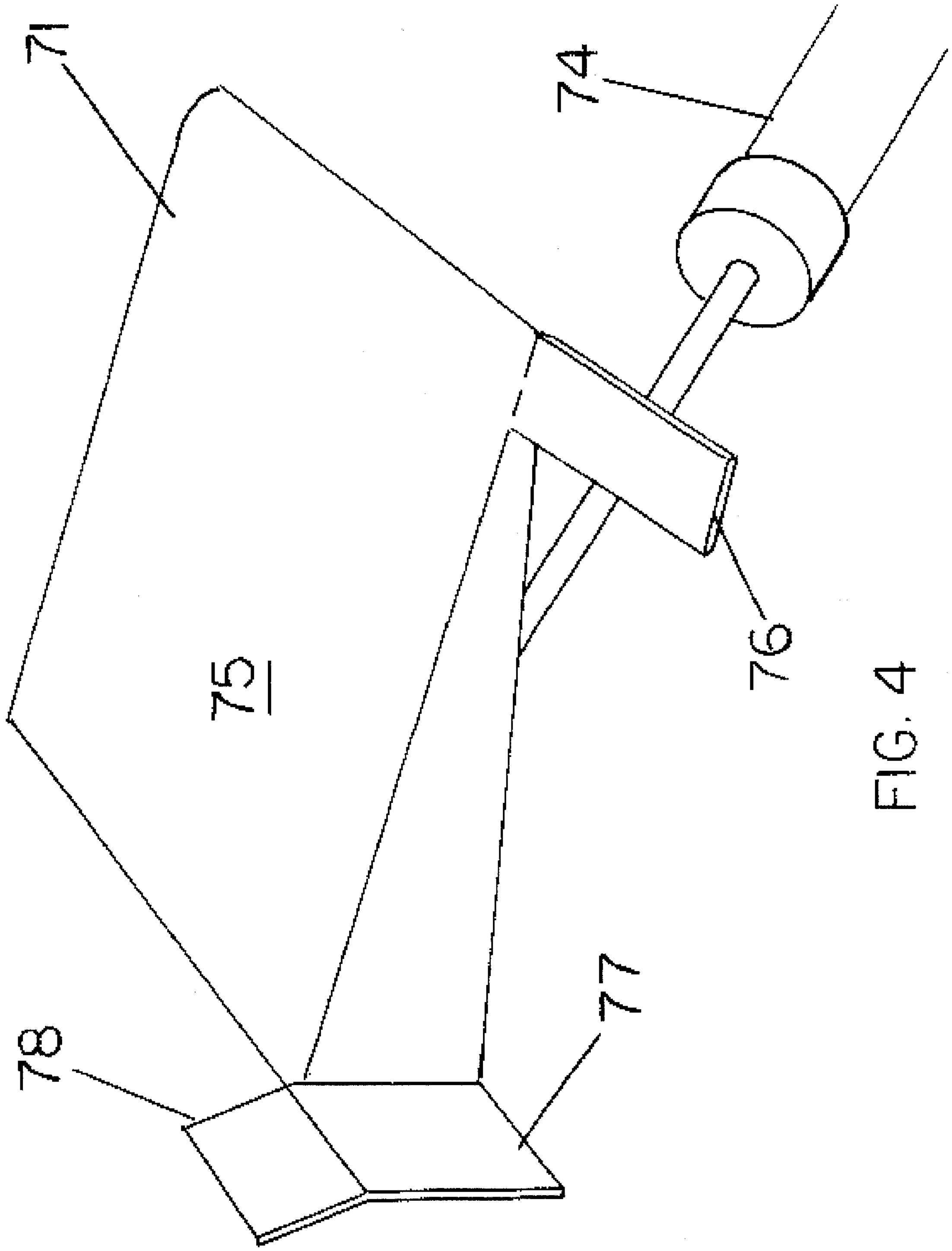
FIG. 4 shows the preferred embodiment of the movable bag support of the present invention.

FIG. 4 shows bag support 71 in greater detail. Bag support 71 has inclined surface 75 upon which bags will rest while being stacked. The end of inclined surface 75 towards the sealing section 40 is higher in vertical elevation than the end of inclined surface 75 away from the sealing section 40. Preferably, the orientation of inclined surface 75 is parallel to the bag carrying surface 480 of transfer arms 48 on rotary transfer device 45 when the arm is adjacent to bag support 71. This match in the inclinations prevents displacement in the bag width direction as the bags slip from transfer arms 48.

To retain the growing stack of bags 90 at the location where the bags hang from bag support 71, bag support 71 has downstream elongated stack former 76, and upstream elongated stack former 77 extending from inclined surface 75. Downstream elongated stack former 76 serves as a stop against which downstream bag edges, i.e. lending edge seal 92 rest as they hang from bag support 71. Additionally, upstream elongated stack former 77 serves to locate upstream bag edges, i.e. downstream edge seal **9*b* where they hang from bag support 71. Further, upstream elongated stack former 77 will have an upstanding extension 78 which is above the level of inclined surface 75 and which is angularly displaced towards heat sealing section 40. This angularly displaced section 78 serves to funnel bags into the closely constrained space between the upstream 77 and downstream 76** elongated stack formers.

Referring again to FIG. 1, wicket conveyer section 50 is of the customary configuration, having a single indexing conveyer chain 53 with the individual stacking plates 52 mounted thereon. Each stacking plate 52 will in turn have one or more upstanding transfer wicket pins 51 mounted thereon over which bags 90 will be deposited as they are stacked. Conveyer section 50 is located within the path of arms 48 on rotary transfer device 45, but nearer the arm that carries the top of the bag, i.e. having lip 90 with openings 93. As the transfer device 45 continues to rotate, punched openings 93 in bag 90 will pass over the upstanding transfer wicket pins 51 and with continued rotation will slide down the pins 51 and be stripped from the rotary transfer device, with the bag being deposited on the surface of stacking plate 52 and bag support 71. To aid in stripping the bag from rotary transfer device 45. It is also customary to disconnect transfer arms 48 from the source of vacuum as the bag 90 begins to slide over the transfer wicket pins 51, and to connect arms 48 to a source of slightly pressurized air to "blow off" the bag onto the pins.

Manufacture and delivery of the bags onto transfer wicket pins 51 will continue until a preselected number of bags corresponding to the desired number of bags in each stack has been produced at the sealing section 40. At that time, the sealing section 40 of the bag machine 10 will pass through one or more idle cycles, i.e. no material is delivered by draw rolls 41 to hot knife 43 and seal roll 42, to enable the wicket conveyer chain 53 to ultimately index the fully formed stack of bags from the stacking station 54 and present a new set of transfer wicket pins 51 on stacking plate 52 for collecting the next set of bags at stacking station 54 without interference from newly formed bags. Since rotary transfer device 45 has one or more bags in transit from sealing section 40 to stacking station 54 at any given time, indexing of wicket conveyer chain 53 is delayed until such time as the last of the counted bags is delivered to transfer wicket pins 51.

Figure 5:
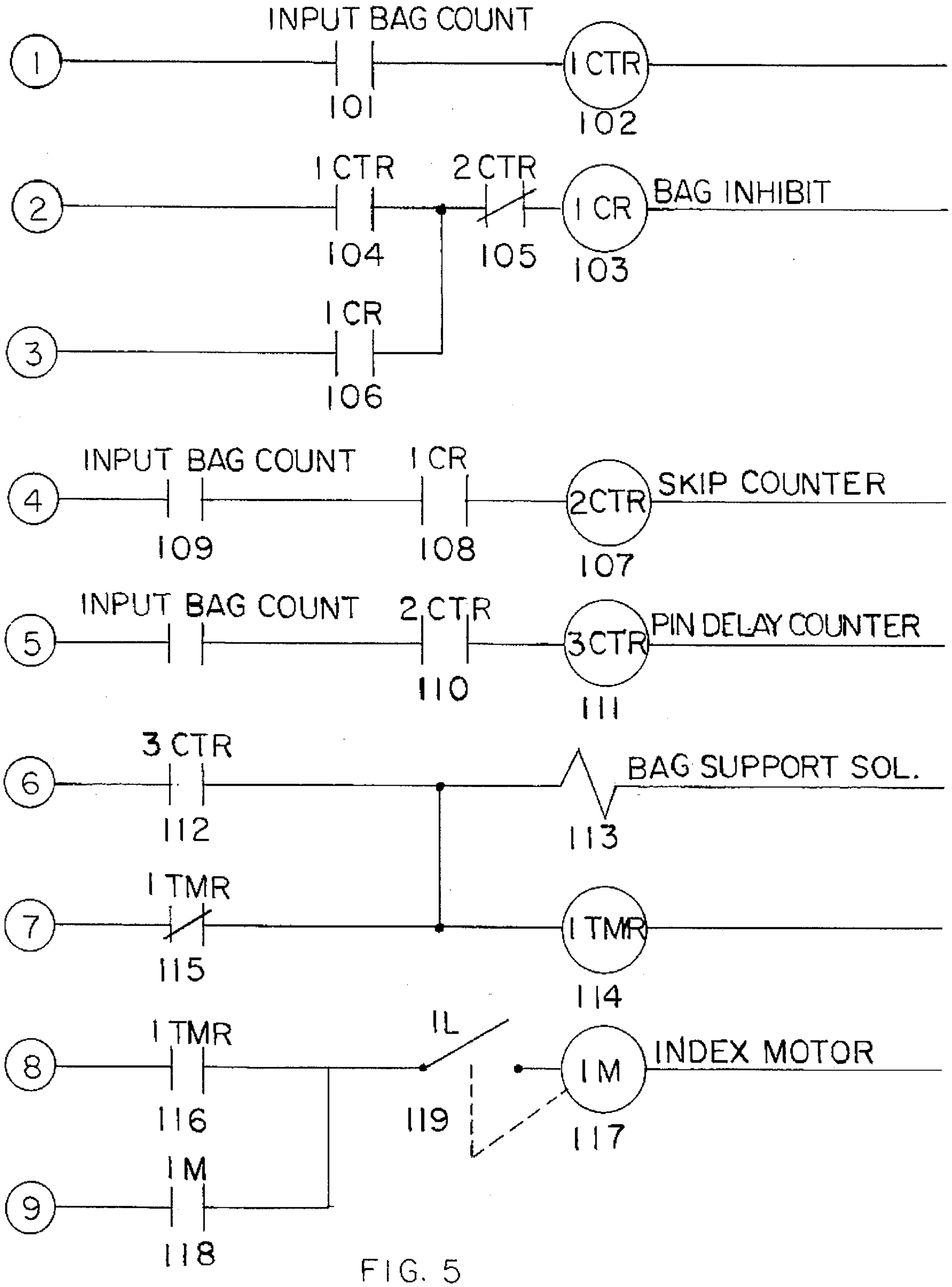
FIG. 5 shows a control schematic indicating the relationship between bag production, support surface position, and wicket conveyer indexing.

Although FIG. 5 is drawn with reference to conventional relay logic, it is to be understood that these functions can also be achieved with a programmable controller. The control logic for the overall indexing cycle is shown in FIG. 5. A series of input pulses, one per bag, is supplied to counter CTR 102 across contacts 101. Upon reaching the full stack count, the "bag inhibit" relay ICR 103 will be energized through the now closed normally open contacts of CTR 104 and the normally closed contacts at 105 2CTR as shown on line 2, and, once energized, will be held by the CR latching contacts 106 shown on line 3. At this point in time, draw rolls will not advance material by virtue of a signal from ICR 103 on the draw roll controls not shown in FIG. 5.

An input pulse corresponding to each machine idle cycle will now be provided to counter 2 CTR 107 through the now closed contacts 108 of ICR shown on line 4 and input bag count contacts 109. As soon as 2CTR 107 begin to receive input pulses and 2CTR reaches a preset count, the contacts of 2CTR on line 5 110 will close, allowing input pulses to be sent to pin delay counter 3CTR 111. Upon reaching the appropriate pin delay count the contact of 3CTR on line 6 112 will close, energizing bag support solenoid 113 and timer 1TMR 114. Energizing solenoid 113 causes bag support to rotate downward freeing the bags for conveyer indexing. A set of immediately on, time delay off contacts of 1TMR in line 7, 115 will also close, holding bag support solenoid 113 on. A set of time delay on contact on 1TMR shown on line 8, 116 will close when 1TMR times out, energizing conveyer index motor starter 117. A set of normally open 118 contacts of 1M shown on line 9 will hold 1M for the index cycle, which will be completed when 1LS 119 shown on line 8 is opened by the indexing conveyer. Further, upon time out of 1TMR, the time delay off contacts of 1TMR in line 7 115 will open, bag support solenoid 113 will be deenergized resulting in bag support 71 returning to its bag receiving position.

In all probability, skip counter 2CTR 107 will have reached its pre-set count by time, causing the normally closed contacts of 2CTR shown on line 2, 105, to open, which will drop out 1CR and result in this resumption of bag production, in anticipation of a new set of transfer wicket pins 51 being properly located at the stacking station by the time the rotary transfer device brings the first of the new bag stack to the stacking location. The number of idle cycles at the sealing station is determined by the time needed for the wicket conveyer index cycle. Bag production at the sealing station will continue until the preselected number of bags per stack has been produced, at which point the overall cycle of idle cycles, time delay, wicket conveyer index cycle, and resumption of bag production will repeat.

While the present invention has been described in relation to its preferred embodiment, it will be apparent to those skilled in the art that other embodiments may be developed without departing from the scope of the claimed invention.

We claim:

1. A movable bag stacking and abutment apparatus for use in a bag making machine equipped with a sealing and severing station, a rotary transfer device having arms for carrying bags and a wicket conveyer stacking station comprising:

a) a bag supporting surface mounted adjacent to said wicket conveyer stacking station, said bag supporting surface vertically movable between a raised bag receiving position and a lowered bag stack indexing position, b) means for moving said bag supporting surface between said raised receiving position and said lowered bag stack indexing position, c) a downstream elongated stack former projecting from the end of said bag supporting surface away from said sealing and severing station, and d) stacking surface control means associated with said bag maker and said wicket conveyer stacking station for moving said bag supporting surface from said bag receiving position to said bag stack indexing position and back again in accordance with the bag making machine and the wicket conveyer stacking station.

2. A movable bag stacking and abutment apparatus according to claim 1 wherein said bag supporting surface comprises an inclined bag supporting surface wherein the inclined surface towards said sealing and severing station is higher than the inclined surface away from said sealing and severing station.

3. A movable bag stacking and abutment apparatus according to claim 1, wherein said inclined surface is oriented eventually parallel to the orientation of the arms of the rotary transfer device at a selected radial position.

4. A movable bag stacking and abutment apparatus according to claim 3 further comprising an upstream elongated stack former projecting from the end of said bag supporting surface towards said sealing and severing station.

5. A movable bag stacking and abutment apparatus according to claim 4 further comprising an upstanding extension on said upstream elongated stack former.

6. In a bag making machine having a sealing and severing station, a rotary transfer device having arms for carrying bags to a stacking station having upstanding pins and a wicket conveyer stacking station, the improvement comprising:

a) a bag supporting surface mounted adjacent to said wicket conveyer stacking station, said bag supporting surface vertically movable between a raised bag receiving position and a lowered bag stack indexing position, b) means for moving said bag supporting surface between said raised receiving position and said lowered bag stack indexing position, c) a downstream elongated stack former projecting from the end of said bag supporting surface away from said sealing and severing station, and d) stacking surface control means associated with said bag machine and said wicket conveyer stacking station for moving said bag supporting surface from said bag receiving position to said bag stack indexing position and back again in accordance with the bag making machine and the wicket conveyer stacking station.

7. A movable bag stacking and abutment apparatus according to claim 6 wherein said bag supporting surface comprises an inclined bag supporting surface wherein the inclined surface towards said sealing and severing station is higher than the inclined surface away from said sealing and severing station.

8. A movable bag stacking and abutment apparatus according to claim 6 wherein said inclined surface is oriented eventually parallel to the orientation of the arms of the rotary transfer device at a selected radial position.

9. A movable bag stacking and abutment apparatus according to claim 8 further comprising an upstream elongated stack former projecting from the end of said bag supporting surface towards said sealing and severing station.

10. A movable bag stacking and abutment apparatus according to claim 9 further comprising an upstanding extension on said upstream elongated stack former.

* * * * *